United States Patent [19]
Orban et al.

[11] 3,917,528
[45] Nov. 4, 1975

[54] FORAMINOUS COMPOSITION FOR REMOVAL OF OLEOPHILIC MATERIAL FROM THE SURFACE OF WATER

[75] Inventors: Julius Orban, Covina, Calif.; Charles E. Case, Summit, N.J.

[73] Assignee: Sorbent Sciences Corporation, Covina, Calif.

[22] Filed: May 29, 1973

[21] Appl. No.: 364,777

[52] U.S. Cl. ............... 210/36; 117/138.8 D; 134/6; 210/40; 210/DIG. 21
[51] Int. Cl.² .......................................... C02B 9/02
[58] Field of Search..... 106/252, 265, 123 TQ, 253; 210/36, 40, DIG. 21; 117/138.8 D; 134/40, 6; 252/426

[56] References Cited
UNITED STATES PATENTS

| | | | |
|---|---|---|---|
| 2,464,202 | 3/1949 | Rust .................................... | 106/252 |
| 2,991,183 | 7/1961 | Lederer et al. ..................... | 106/252 |
| 3,228,899 | 1/1966 | Elmer et al. ........................ | 106/252 |
| 3,667,608 | 6/1972 | Burroughs et al. .......... | 210/DIG. 21 |
| 3,681,237 | 8/1972 | Orban et al. ........................ | 210/40 |
| 3,755,189 | 8/1973 | Gilchrist et al. ............. | 210/DIG. 21 |
| 3,770,575 | 11/1973 | Ball ............................. | 210/DIG. 21 |

*Primary Examiner*—Samih N. Zaharna
*Assistant Examiner*—Ivars Cintins
*Attorney, Agent, or Firm*—Burgess, Dinklage & Sprung

[57] ABSTRACT

A composition employed to sorb oleophilic material from a surface, especially a composition to preferentially sorb an oleophilic substance from a hydrophilic substance, e.g., comprising a foraminous substrate impregnated with a drying oil; a method of removing an oleophilic material from a surface which comprises contacting the same with a composition comprising a foraminous substrate, said substrate impregnated with a drying oil; a method of removing an oleophilic liquid from a hydrophilic liquid which comprises contacting a mixture thereof with a foraminous substrate impregnated with a drying oil.

10 Claims, No Drawings

3,917,528

FORAMINOUS COMPOSITION FOR REMOVAL OF OLEOPHILIC MATERIAL FROM THE SURFACE OF WATER

BACKGROUND OF THE INVENTION

1. Field of the Invention

This invention relates to the removal of oil and other oleophilic material from a surface, e.g., a hydrophilic surface especially water. More particularly, this invention is directed to the removal of crude oil and its factions thereof from the surfaces of bodies of water. This invention is particularly directed to a composition employed to remove such oleophilic material by preferentially sorbing the same.

2. Discussion of the Prior Art

It has long been recognized that the pollution of various bodies of water by crude oil and its fractions thereof has presented a considerable problem to the ecology. Many methods for the removal of crude oil and its fractions have been proposed. These involve, inter alia, the use of oil guide booms which segregate the oil from the water. Another method of removing the oil from the water involves the use of a sorbent. This sorbent preferentially sorbs the oil component and leaves behind the water. For this purpose, foraminous materials have been proposed, especially foraminous material of an oleophilic nature.

It has also been heretofore proposed to employ foraminous material such as polyurethane foams which have been treated with an oleophilic agent to render them more preferentially sorbent with respect to crude oil and its components. To such end, it has been proposed to treat the foraminous substrate with oleophilic agents such as solvent or softening agents, alkanes and cycloalkanes as well as aromatic hydrocarbons such as benzene, ethylbenzene, naphthalenes, toluene and xylene have been proposed. It has also been proposed to coat the surface of the foraminous material with materials such as natural waxes, such as petroleum waxes, vegetable waxes, such as carnauba wax or candelilla wax, animal and insects waxes, etc. For instance, U.S. Pat. No. 3,681,237 discloses the preparation of a material employed to control oil pollution on the open seas and in calm waters, which material consists of a foam material coated with a hydrophobic-oleophilic treating composition. It has also been proposed to include into the coating composition of the foraminous substrate an anti-fungal - anti-bacterial agent which prevents the bacteria or fungi present in the water from having an adverse effect upon the hydrophobic-oleophilic coating composition.

These compositions indeed, sorb crude oil and its fractions preferentially and help to remove these components from open seas or calm waterways. However, in so doing they tend to leave a minor oleophilic residue on the surface of the water being removed of its oleophilic contaminants. Secondly, these materials take an exceptionally long period of time to remove the crude oil or other oleophilic material. This is a decided disadvantage, especially in the case of open waterways or in rapidly flowing rivers and the like where the current tends to disperse the crude oil or other material being removed. It has thus become desirable to provide a composition which rapidly and preferentially sorbs the oleophilic material disposed on the water without leaving an oleophilic residue of its own.

The prior art type of sorbents have sorbed appreciable amounts of crude oil and the like. However, these amounts that have been absorbed have not been sufficiently high to take care of all oil spills. Specifically in certain cases it is desired to provide a foraminous sorbent which sorbs substantially more crude oil or the like from the surface of water per unit weight or per unit volume of sorbent composition. Thus, it has become an object of the present invention to provide a composition which sorbs substantially more crude oil or fraction thereof from an open body of water such as from the open seas than heretofore sorbed.

SUMMARY OF THE INVENTION

Broadly, this invention contemplates a composition employed to preferentially and rapidly sorb oleophilic material from a body of water, which composition comprises a foraminous substrate, said substrate impregnated with a drying oil.

This invention further contemplates a method of controlling oil pollution of open seas and calm waters by removal therefrom of oleophilic material by contacting the water containing oleophilic material with a composition comprising a foraminous substrate, said substrate impregnated with a drying oil.

A method of preparing the foraminous substrate containing the drying oil composition of the present invention comprises suspending a foraminous substrate in a bath containing a drying oil for at least 0.5 minute, thereafter removing the same from said bath and removing excess drying oil by passing the same between mechanical rollers.

In accordance with the present invention, it has been found that a foraminous substrate treated with a drying oil sorbs substantially more crude oil or other hydrocarbonaceous contaminants from the surface of water than sorbed by compositions otherwise the same but not containing any drying oil. Moreover, it has been found that the rate of sorption is markedly higher in the case of compositions containing a drying oil component than other oleophilic treated foraminous materials free of drying oil.

In accordance with the present invention a foraminous substrate is treated with a drying oil. Generally speaking the foraminous material can be any natural or synthetic foraminous material. For instance, non-woven fabrics especially those having a void content of at least 60 percent can be employed. It is particularly desirable to employ non-woven fabrics made of oleophilic fibers. Thus, the non-woven fabric can be made of nylon, polyester, polyether, polyolefin and the like. Additionally, and desirably, the foraminous substrate can be a synthetic foam such as a polyurethane foam. It should be recognized, however, that the nature of the foraminous material is not particularly critical, inasmuch as pursuant to the present invention, the foam is treated to render the same more oleophilic.

The foraminous substrate can be pre or post treated with other oleophilic materials or, for the matter, with anti-fungal or anti-bacterial agents. Thus, the foraminous material can also be treated with other hydrophobic-oleophilic materials other than the drying oil. Thus, it is within the scope of the present invention to treat the foraminous material with agents which form a hydrophobic-oleophilic shield which prevents water from passing through the cells of the foam material. These agents can be in the form of bonding agents and as such include a base or binder which assists in holding the hydrophobic-oleophilic agent to the walls of the foam material. As water repelling agents there can be employed substantially any of the known water repellents for paper, leather, textiles and concrete and masonry. Thus, for example, suitable water-repellents include metal salts and oxides such as aluminum salts, aluminum acetate, zirconium chloride, proteins, glues, tannin, dichromates, silicon compounds such as methyltrichlorosilane long-chain silicon acetates, silicon resins such as poly(dimethylsiloxanes), known water repelling natural and vegetable waxes or petroleum waxes, and hydrophobic agents such as paraffins, aromatic hydrocarbons and higher alcohols. It is particularly contemplated to employ oleophilic agents of a hydrocarbonaceous nature such as one or more straight chain saturated hydrocarbons of at least four carbon atoms especially those alkanes of between four and twelve carbon atoms as well as cycloalkanes containing from about five to about ten carbon atoms, such as cyclopentane, cyclohexane and cycloheptane. The use of aromatic hydrocarbons and alkyl aromatic hydrocarbons is also contemplated. Generally speaking, the foraminous material will contain between 30 and 90 percent by weight, based upon the weight of the final composition of such oleophilic material.

As stated above, the foraminous material is impregnated, pursuant to the present invention, with a drying oil. Generally speaking, the final composition contains between 5 and 40 percent by weight drying oil, preferably between 10 and 20 percent by weight drying oil, based upon the weight of the final product. Numerous drying oils are contemplated within the scope of the present invention. These drying oils have been found to provide a marked increase in the rate of sorption of crude oil and other hydrocarbonaceous materials from open seas and waterways. Particularly contemplated, drying oils include: castor oil, grape seed oil, hemp oil, raw and refined linseed oil, Oiticica oil, perilla oil, poppy-seed oil, rapeseed oil, safflower oil, raw and refined soybean oil, sunflower oil, tobacco seed oil, tung oil, herring oil, menhaden oil, sardine oil and raw or refined tall oil. These oils generally have a saponification value between 160 and 195.

Generally speaking, the foraminous material is impregnated with the drying oil simply by suspending the sheet in a bath containing the drying oil to be sorbed. While not wishing to be bound by any theory, it is believed that the drying oil coats the walls of the cells of the foraminous material and enters the interstices thereof to form a generally continuous hydrophobic-oleophilic barrier which prevents the water from being sorbed within the foraminous material. After the foraminous material has sorbed the desired amount of drying oil, the same is squeezed and dried to remove excess oil. In carrying out the present invention, it is desired to employ the drying oil in admixture with other hydrophobic-oleophilic materials. Specifically, it is desired to include minor amounts of drying oil in a liquid bath containing major amounts of other hydrophobic oleophilic materials. For this purpose, it has been found that chlorinated hydrocarbons such 1,1,1 - trichloroethane assist in providing the desired hydrophobic-oleophilic effect upon the foraminous substrate. It is additionally desired to include in the liquid bath materials such as silicones. For that matter, chlorinated paraffins in minor amounts of crude oil can also be employed in the treatment of the foraminous substrate to render the same more hydrophobic-oleophilic. However, it is the drying oil component which markedly increases the rapidity of oil adsorption and markedly increases amount of oil that is sorbed. There is set forth below in tabular form typical compositions which can be employed as a bath in which the foraminous substrate is suspended.

From the table below, it will be realized that numerous different agents can be employed in combination with one another to provide the desired hydrophobic-oleophilic coating on the cells of the foraminous substrate. It has been found in particular that a mixture of safflower oil and conjugated safflower oil works especially well in providing the improved oil absorption. It has also been found that the conjugated safflower oil can be employed with perilla oil, another drying oil. Generally speaking, the weight ratio or unconjugated drying oil to conjugated drying oil is from 0.1 to 10. This combination provides especially desirable rapid absorption of the oil on to the treated foraminous material.

After the foam material has been suspended in the treating bath which generally takes between 0.5 and 5 minutes for a sheet having the approximate dimensions of six feet by two feet by one and one-half inch, the same is squeezed and vacuum dried to remove excess treating agent. The squeezing operation can be performed by passing the so-treated sheet through the nip of mechanical rollers which bear against one another. The pressure at the nip will be dependent upon the type of foraminous substrate employed and especially its density and will also depend upon the amount of excess oil to be removed. The same is thereafter dried by subjecting the so-squeezed foraminous substrate to a vacuum. In such form, it is ready to be employed to sorb spilled oil from lakes and open seas. Preferably, the impregnated foam is vacuum packed until used.

As indicated below, it is desirable to include into the mixture of treating agents a vinyl monomer. Vinyl monomers contemplated, in accordance with the invention, include in particular methyl methacrylate, ethyl methacrylate, acrylo nitrile, styrene and the like.

TABLE I

| | WEIGHT % OF BATH IN WHICH FORAMINOUS SUBSTRATE IS SUSPENDED | |
|---|---|---|
| Ingredient | Broad Range | Preferred Range |
| Halogenated Liquid Hydrocarbon | 20 to 80 | 60 to 80 |
| Silicone in solution (amount is based upon weight of silicone without considering solvent) | 1 to 10 | 3 to 8 |
| Drying Oil | 5 and 20 | 5 and 15 |
| Oil crude | 0 to 5 | 1 to 3 |
| Halogenated Paraffin or synthetic polyolefin wax of molecular weight 100 to 10,000 of halogen atomic weight 50 to 80 | 1 to 10 | 3 to 8 |
| Vinyl Monomer | 0 to 5 | .5 to 2 |
| Anti-Fungal Agent | 0 to 3 | .2 to 2 |
| Anti-Bacterial Agent | 0 to 3 | .2 to 2 |

While the composition of the present invention can be employed to preferentially remove virtually any liquid oleophilic material from water, it is especially useful in removing those hydrocarbonaceous materials which have caused ecological problems. Such materials include the mineral hydrocarbonaceous materials such as No. 2 Fuel Oil, crude oils, especially Arabian light crude, Pennsylvania crudes, Libian crudes, Texas crudes and crudes found in the Gulf of Mexico. They are also useful in preferentially sorbing lube oil components, South California crudes, and bunker "C" oil. It should be understood that these compositions can also sorb naphthas, gasolines, kerosenes, jet fuels and other liquid hydrocarbonaceous agents, especially those derived from crude oil. It is also useful for those non-hydrocarbonaceous mineral oils such as extracts from trees and plants.

In order to more fully illustrate the nature of the invention and the manner of practicing the same, the following examples are presented:

EXAMPLE 1

100 polyurethane sheets each of a dimension of 6 feet × 2 feet × 1½ inches are obtained and are cleansed in a tank of trichloroethane solvent. The trichloroethane solvent is squeezed out of the polyurethane sheet and the sheet is let dry. A treating solution having the following composition is prepared:

| | |
|---|---|
| 1.1.1 - trichloroethane | 110 gallon |
| Silicone solution 50% strength | 15 gallon |
| Safflower oil | 6 lbs. |
| Safflower oil, conjugated | 1 lb. |
| Oil Crude | 3 lbs. |
| 700X Chlorinated paraffin | 150 lbs. |

The reagents are mixed in the sequence stated above and are stirred at room temperature. The sheets are introduced at a residence time of one sheet for 2 minutes, i.e., each sheet is allowed to be suspended in the bath for a period of 2 minutes. The treated foam sheets are squeezed between mechanical rollers opposed to one another and the so-squeezed sheets are vacuum dried.

When tested, one pound of the foam so treated sorbs about 36 lbs. of spilled oil almost instantaneously. The sotreated foam functions as a general purpose oleophilic adsorbent.

EXAMPLE 2

Example 1 is repeated except that the bath contains a vinyl monomer. The composition of the bath is as follows:

| | |
|---|---|
| 1.1.1 - trichloroethane | 120 gallon |
| Styrene | 1 lb. |
| Safflower oil | 6 lbs. |
| Safflower oil, conjugated | 1 lb. |
| Oil Crude | 3 lbs. |
| 700X Chlorinated paraffin | 150 lbs. |
| lauryl peroxide | 0.01 lbs. |

The reagents are mixed in the order set forth above and stirred. The foams of dimension 6 feet × 2 feet × 1½ inches are introduced at a rate such that each sheet is suspended in the bath for a period of about two minutes. After it is suspended in the bath, it is passed through a wringer which squeezes the same dry. The foam is thereafter subjected to a temperature of 150° F for 30 minutes to ensure that the same is dry.

When tested, one pound of treated foam picks up about 34 lbs. of spilled oil virtually instantly. The foam is also an excellent water repellant under atmospheric conditions.

EXAMPLE 3

A polyurethane having a density of 0.1 lb. per cu. ft. is employed as a foraminous substrate. 100 sheets of the same each measuring about 6 feet × 2 feet × 1½ inches are treated with a mixture of hydrophobic-oleophilic agents. The mixture comprises the following materials:

| | |
|---|---|
| 1.1.1 - trichloroethane | 100 gallon |
| Silicone oil solution | 15 gallon |
| Safflower oil, conjugated | 2 lbs. |
| Perilla oil | 2 lbs. |
| Oil Crude | 4 lbs. |
| 700X Chlorinated paraffin | 150 lbs. |

After the chemicals are mixed together in the sequence set forth and stirred, the foams are treated such that each foam sheet has a residence time within the bath of two minutes. The treated foam is squeezed by a wringer and vacuum dried. The foam is specifically designed for heavier oils, i.e., higher viscosity oils or oils at lower environmental temperature.

When tested, the foam sorbs about 40 lbs. of oil per 1 lbs. of foam.

In order to demonstrate the effect that the drying oil had upon various hydrocarbonaceous materials, there is set forth below data obtained by testing a foraminous substrate containing drying oil vs. a foraminous substrate free of drying oil. In the tests below, the composition of the present invention was prepared by subjecting polyurethane sheets of a bulk density of about 1.3 lbs./cu. feet having dimensions of 6 feet × 2 feet × 1½ inches to a mixture whose composition is set forth below:

| | |
|---|---|
| 1,1,1 - trichloroethane | 75% |
| silicone dispersion | 6% |
| safflower oil, conjugated | 5% |
| safflower oil, unconjugated | 5% |
| chlorinated wax | 8.7% |
| crude oil | 0.3% |

The foraminous material which did not contain drying oil was treated in the same manner as the one containing drying oil and was of the same composition. However, it was treated by a bath which was free of drying oil. That bath had the following composition:

| | |
|---|---|
| 1,1,1 - trichloroethane | 85% by wt. |
| silicone dispersion | 6% |
| chlorinated wax | 8.7% |
| crude oil | 0.3 |

Tests were conducted to determine the rate of sorption of various oils by the drying oil treated foraminous substrate versus the foraminous substrate free of drying oil. The rate of oil absorption by the foams is set forth in Table 2 below:

TABLE 2.

| RATE OF OIL ABSORPTION BY FOAMS | | |
|---|---|---|
| Oil Type | Time to oil saturation | |
| | Drying Oil Treated | No Drying Oil Treatment |
| JP No. 4 | 0.1 minute | 0.5 min. |
| Fuel No. 2 | 0.4 minute | 1.2 min. |
| Arabian Light Crude | 0.6 minute | 21 min. |
| 30 Weight Lube Oil | 5.2 minute | 4,200 min. |
| S. California Crude | 6 minute | 360 min. |
| Bunker "C" | 71 minute | 1,200 min. |

From the data from the Table it is seen that the oil absorption rate ranges from three times faster in the lower viscosity oil, Fuel Oil No. 2, to about eight hundred times faster in respect of higher viscosity oils such as the 30 weight lube oil. The effect is solely due to the oleophilic coating provided by the drying oils on the foam, inasmuch as all other parameters have been held constant.

It was also observed that the foraminous material containing the drying oil did not leave a thin film of oleophilic material on the clear water surface, whereas the prior art foam material, i.e., the one not containing any drying oil, left a thin film of oily origin on water surface.

In order to demonstrate the extent of oil absorption by the drying oil treated foams vs. foams containing no drying oil, a similar test was conducted. The foam employed was in the form of a sheet having a dimension of 6 feet × 2 feet × 1½ inches. The sheet was polyurethane having a bulk density of about 1.3 lbs./cubic foot and a void content of about 60 percent. The polyurethane sheet was in both instances treated with the compositions whose components are set forth above in respect of the comparative test whose results are set forth in Table 2 above. Sheets containing such drying oil were compared for their oil absorption capacity against sheets free of drying oil.

In Table 3, below, there is set forth the results of oil absorption for the drying oil treated foams vs. the foams free of drying oil.

Table 3.

OIL ABSORPTION CAPACITIES OF FOAMS

| Oil Type | Weight of Oil Absorption in One Minute | |
|---|---|---|
| | Drying Oil Treated | No Drying Oil Treatment |
| Fuel No. 2 | 30X | 24X |
| Arabian Light Crude | 13X | 3.2X |
| 30 Weight Lube Oil | 11.3X | 1.7X |
| S. California Crude | 4.4X | 2.5X |
| Bunker "C" | 3.7X | 2.1X |

From the above data it is evident that the drying oil treatment improves both the rate and capacity of oil absorption while all other parameters are maintained constant. The treated foam absorbs 25 percent more than the untreated foam for low viscosity fual oil No. 2 and absorbs up to 500 percent more in the high viscosity oil such as in respect of 30 Weight Lube Oil.

From the above, it is seen that the foraminous composition of the present invention is markedly superior for the absorption of virtually all hydrocarbonaceous oleophilic materials. It can be used in open seas or in inland waterways such as lakes and in rivers. It does not require the use of intricate oil booms or the like, inasmuch as the foam functions to absorb the oil on the water rather than to merely effect an agglomeration of the oil droplets. The foams of the present invention sorb significantly large amounts of hydrocarbonaceous material. It will be seen that the foams sorb an amount of oil equivalent to between 20 and 60 times their own weight. This rapidity of oil absorption and increase in sorpotion capacity is due directly to the presence of drying oil, even though the same is present in an amount of less than 50 percent by weight of the final composition.

In many bodies of water the foam is in the form of a boom or filter column. In a placid body of water sheets of the material are employed.

The foraminous impregnated material of the invention is distinguishable from other impregnated foraminous materials in that it is dry and colorless. By dry it is meant that when the foam is rubbed across a sheet of which apper and the paper is held to the light no liquid is observed to be deposited on the paper. The test of this property is to exert a pressure of 5 pounds per square inch applied pressure on the foam for a period of 2 minutes while the same is on a piece of white paper. The paper is held to the light and examined by the naked eye. If no liquid is observed, the foam is considered a dry foam.

Foraminous substances of the invention are dry even when ten and even fifteen pounds per square inch of applied pressure are applied to the foam during the test.

Since the products of the invention are dry there is only a small difficultly detectable odor from them, whereas the prior art materials have a distinctive heavy undesirable odor.

The foam of the present invention is useful to absorb an oleophilic substance from a dry surface such as concrete or metal. It can be used to sponge off oleophilic substances such as oil from roadways, rollers employed in the printing industry and the like. Specifically, the foraminous material can be used in the following uses:

1. removal of oil from sulfuric acid bath
2. removal of oil based inks and lubricating oils from printing presses and their parts.
3. removal of food oils from interfaces, e.g., in cooling systems in mayonnaise plants
4. removal of oils especially vegetable oils from surfaces in food oil container plants where the foam acts as a filter
5. removal of oleophilic waste materials from chemical plants, e.g., creosote plants, paper mills, steel mills The foam is particularly useful in separate phase situations where a separate oleophilic phase is created which is immiscible or partially immiscible with a hydrophilic phase.

From the above disclosure, it is apparent that there are numerous modifications of the present invention. For instance instead of employing a bath of hydrophobic-oleophilic materials one can suitably spray the same on to the foraminous substrate. However, the use of a bath is simple, efficient and desirable. Also, it requires substantially less time for the coating of the cells of the foam with the hydrophobic-oleophilic material. Accordingly, the present invention is not to be considered as limited, except as set forth in the appended claims.

What is claimed is:

1. A composition useful to preferentially sorb oleophilic materials on the surface of water which comprises a solid foraminous substrate capable of sorbing oleophilic liquids, said substrate impregnated with between 5 and 20 percent by weight drying oil, said drying oil being selected from the group consisting of castor oil, grape seed oil, hemp oil, raw linseed oil, refined linseed oil, Oiticica oil, perilla oil, poppy-seed oil, rapeseed oil, safflower oil, raw soybean oil, refined soybean oil, sunflower oil, tobacco seed oil, tung oil, herring oil, menhaden oil, sardine oil, raw tall oil and refined tall oil wherein a mixture of a conjugated drying oil and unconjugated drying oil are employed and the weight ratio of conjugated drying oil to unconjugated drying oil is between 0.1 and 10.

2. A composition according to claim 1 wherein said foraminous substrate is polyurethane and said drying oil is a safflower oil.

3. A composition comprising a solid foraminous substrate capable of sorbing oleophilic liquids, said substrate impregnated with a drying oil in an amount between 5 and 20 percent by weight, said drying oil selected from the group consisting of castor oil, grape seed oil, hemp oil, raw linseed oil, refined linseed oil, Oiticica oil, perilla oil, poppy-seed oil, rapeseed oil, safflower oil, raw soybean oil, refined soybean oil, sunflower oil, tobacco seed oil, tung oil, herring oil, menhaden oil, sardine oil, raw tall oil and refined tall oil wherein the foraminous material contains the following agents in the following amounts:

|  | Weight % |
|---|---|
| Halogenated Liquid Hydrocarbon | 10 to 30 |
| Silicone | 2 to 5 |
| Drying Oil | 7 to 15 |
| Oil Crude | .1 to 1 |
| Halogenated Paraffin | 1 to 5 |

4. A composition comprising a solid foraminous substrate capable of sorbing oleophilic liquids, said substrate impregnated with a drying oil in an amount between 5 and 20 percent by weight, said drying oil being selected from the group consisting of castor oil, grape seed oil, hemp oil, raw linseed oil, refined linseed oil, Oiticica oil, perilla oil, poppy-seed oil, rapeseed oil, safflower oil, raw soybean oil, refined soybean oil, sunflower oil, tobacco seed oil, tung oil, herring oil, menhaden oil, sardine oil, raw tall oil and refined tall oil wherein the foraminous substrate is impregnated with a composition comprising the following agents in the amounts set forth below:

|  | Weight % |
|---|---|
| Halogenated Liquid Hydrocarbon | 5 to 40 |
| Silicone | 1 to 10 |
| Drying Oil | 5 to 40 |

5. A process for removing a liquid oleophilic material from a body of water which comprises contacting the same with a composition comprising a solid foraminous substrate capable of sorbing oleophilic liquids, said substrate impregnated with between 5 and 20 percent by weight drying oil, said drying oil selected from the group consisting of castor oil, grape seed oil, hemp oil, raw linseed oil, refined linseed oil, Oiticica oil, perilla oil, poppy-seed oil, rape seed oil, safflower oil, raw soybean oil, refined soybean oil, sunflower oil, tobacco seed oil, tung oil, herring oil, menhaden oil, sardine oil, raw tall oil and refined tall oil.

6. A process for removing a liquid oleophilic material from a body of water according to claim 5 wherein a mixture of a conjugated drying oil and unconjugated drying oil is employed as the drying oil and the weight ratio of conjugated drying oil to unconjugated drying oil is between 0.1 and 10.

7. A process for removing a liquid oleophilic material from a body of water according to claim 5 wherein the foraminous oleophilic sorbent substrate is impregnated with a composition comprising the following agents in the amounts set forth below:

|  | Weight % |
|---|---|
| Halogenated Liquid Hydrocarbon | 5 to 40 |
| Silicone | 1 to 40 |
| Drying Oil | 5 to 40 |

8. A process for removing a liquid oleophilic material from a body of water according to claim 5 wherein the foraminous material contains the following agents in the following amounts.

|  | Weight % |
|---|---|
| Halogenated Liquid Hydrocarbon | 10 to 30 |
| Silicone | 2 to 5 |
| Drying Oil | 7 to 15 |
| Oil Crude | .1 to 1 |
| Halogenated Paraffin | 1 to 5 |

9. A process according to claim 5 wherein said foraminous substrate is polyurethane and said drying oil is a safflower oil.

10. A process for removing a liquid oleophilic material from a surface which comprises contacting the same with a solid foraminous substrate capable of sorbing oleophilic liquids, said substrate impregnated with between 5 and 20 percent by weight drying oil, said drying oil being selected from the group consisting of castor oil, grape seed oil, hemp oil, raw linseed oil, refined linseed oil, Oiticica oil, perilla oil, poppy-seed oil, rape seed oil, safflower oil, raw soybean oil, refined soybean oil, sunflower oil, tobacco seed oil, tung oil, herring oil, menhaden oil, sardine oil, raw tall oil and refined tall oil.

* * * * *